United States Patent
Andersen

(10) Patent No.: US 11,323,666 B1
(45) Date of Patent: May 3, 2022

(54) DYNAMIC DEPTH-COLOR-CORRECTION

(71) Applicant: Paralenz Group ApS, Rødovre (DK)

(72) Inventor: Nikolaj Bech Andersen, Copenhagen (DK)

(73) Assignee: Paralenz Group ApS, Rødovre (DK)

(*) Notice: Subject to any disclaimer, the term of this patent is extended or adjusted under 35 U.S.C. 154(b) by 0 days.

(21) Appl. No.: 17/523,938

(22) Filed: Nov. 11, 2021

(30) Foreign Application Priority Data

Nov. 13, 2020 (DK) .............................. PA202070753

(51) Int. Cl.
  *H04N 9/73* (2006.01)
  *H04N 9/04* (2006.01)
  *H04N 5/225* (2006.01)

(52) U.S. Cl.
  CPC ....... *H04N 9/04517* (2018.08); *H04N 5/2252* (2013.01); *H04N 9/04559* (2018.08)

(58) Field of Classification Search
  CPC  H04N 5/243; H04N 9/64; H04N 9/73; H04N 9/735; G03B 17/08
  USPC ................................................. 348/81, 223.1
  See application file for complete search history.

(56) References Cited

U.S. PATENT DOCUMENTS

| | | | |
|---|---|---|---|
| 5,438,363 A | 8/1995 | Ejima et al. | |
| 7,760,994 B2 | 7/2010 | Takita | |
| 8,860,798 B2 | 10/2014 | Kino | |
| 9,412,183 B2 * | 8/2016 | Johnson | G06T 11/001 |
| 2006/0114335 A1 * | 6/2006 | Hara | H04N 9/735 348/223.1 |
| 2010/0259606 A1 * | 10/2010 | Hasegawa | H04N 9/735 348/81 |
| 2011/0187890 A1 * | 8/2011 | Takayama | G03B 17/08 348/223.1 |
| 2011/0228074 A1 | 9/2011 | Parulski et al. | |
| 2011/0228075 A1 | 9/2011 | Madden et al. | |
| 2012/0075458 A1 | 3/2012 | Kino | |
| 2012/0188362 A1 | 7/2012 | Takimoto et al. | |
| 2012/0243854 A1 | 9/2012 | Takimoto et al. | |

(Continued)

FOREIGN PATENT DOCUMENTS

| | | |
|---|---|---|
| EP | 2550559 B1 | 1/2014 |
| JP | 2004282460 A2 | 10/2004 |

(Continued)

OTHER PUBLICATIONS

3rd Technical Examination Report from the Danish Patent and Trademark Office dated Aug. 6, 2021.

(Continued)

*Primary Examiner* — Anthony J Daniels
(74) *Attorney, Agent, or Firm* — aera A/S

(57) ABSTRACT

An imaging device and a method for capturing images under water and dynamically adjusting gain values for use in color correction. Minimum and maximum gain values as a function of depth are provided and a value of a parameter indicative of a point in a range between minimum and maximum gain values for a water depth is dynamically adjusted based on white balance analysis of the last captured image. A current gain value for a color of the color filter array is then determined based on the stored minimum and maximum gain values, the determined water depth, and the current parameter value and applied in the image/video pipeline to color correct the next image.

10 Claims, 4 Drawing Sheets

(56) References Cited

U.S. PATENT DOCUMENTS

| | | |
|---|---|---|
| 2013/0176416 A1 | 7/2013 | Fukui |
| 2014/0071264 A1* | 3/2014 | Seo .................. H04N 9/735 |
| | | 348/81 |
| 2019/0098179 A1 | 3/2019 | Hung et al. |

FOREIGN PATENT DOCUMENTS

| | | |
|---|---|---|
| WO | 2011119319 A1 | 9/2011 |
| WO | 2017198746 A1 | 11/2017 |

OTHER PUBLICATIONS

2nd Technical Examination Report from the Danish Patent and Trademark Office dated Apr. 19, 2021.
1st Technical Examination Report from the Danish Patent and Trademark Office dated Feb. 22, 2021.

\* cited by examiner

DYNAMIC DEPTH-COLOR-CORRECTION

FIELD

The invention relates to digital images and videos captured under water, and in particular to white balance correction of these.

BACKGROUND

The light absorption spectrum of water has a significant impact on underwater photography. Water attenuates longer wavelength light (reddish colors) more than shorter wavelength light (bluish colors), so that images and videos captured under water with normal color balancing settings for air will be dominated by the short wavelength bluish colors while the longer wavelength reddish colors will be missing. Since this absorption is proportional to the underwater path length of the light, the effect increases with the depth at which the capturing is made.

Numerus solutions to this challenge has been proposed, with the more advanced increasing a gain value on the absorbed colors with increasing water depths, see e.g. U.S. Pat. No. 7,760,994. In EP 2 550 559 B1 and EP 2 550 558 A1, different given gain factor functions can be used for different water types. To generate such a gain factor function for a particular water type, a grayscale test target is photographed at various distances corresponding to different total water path lengths to determine gain values, and a functional form is determined using standard curve fitting methods.

Even with the more advanced solutions, poor or unrealistic colors and sudden color changes are often experienced.

SUMMARY

In one aspect, the invention relates to a digital imaging device for capturing images under water, such as a submersible imaging device, comprising:
- a watertight housing;
- a means for sensing a pressure outside the watertight housing;
- an image sensor for capturing digital images, the image sensor comprising a color filter array;
- an optical system for imaging a scene onto the image sensor; and
- a device control unit comprising a memory and a processor;
  wherein the memory is configured to hold:
  minimum and maximum gain values for a color of the color filter array as a function of water depth;
  an initial value of a parameter indicative of a point in a range between minimum and maximum gain values for a water depth, the initial value is to be used as a first current value of the parameter; and
  wherein the device control unit is configured to adjust a gain value for a color of the color filter array by:
  capturing and storing an image with a current gain value;
  performing a white balance analysis of the stored image;
  based on the white balance analysis, determining whether the current parameter value should be adjusted towards the stored minimum or the stored maximum gain values and upon determining that the current parameter value should be adjusted, adjusting the parameter value by a predetermined amount and saving the new current parameter value;
  determining a water depth of the imaging device from a sensed pressure outside the watertight housing;
  determining and saving a new current gain value based on the stored minimum and maximum gain values, the determined water depth, and the current parameter value.

In a preferred embodiment, the adjustment of the parameter value and the gain value is only performed if the resulting gain value does not exceed the stored minimum or maximum gain value for the determined water depth.

Throughout the description, 'depth' or 'water depth' and symbol 'D' refers to the vertical distance to the surface of a body of water when the imaging device is submerged. When the imaging device is not submerged, such as above or at the surface, the depth will be zero, corresponding to the means for sensing a pressure experiencing atmospheric pressure.

The gain value may be a gain value common for two or more colors of the color filter array, or each of two or more colors of the color filter array may each have an individual gain value.

The parameter, P, is indicative of a point in a range between minimum and maximum gain values for a water depth. In an exemplary embodiment, $P \in [0; 1]$ with $P=0$ indicating the minimum gain value and $P=1$ indicating the maximum gain value. As for the gain value, the parameter may be common for two or more colors of the color filter array, or each of two or more colors of the color filter array may each have an individual parameter.

In an embodiment, the imaging device is configured to capture a video under water, and the device control unit is configured to adjust a gain value for a color of the color filter array at predetermined intervals—such as time intervals, depth intervals, or video frame count intervals—during video capturing, using a captured and stored video frame as the stored image on which the white balance analysis is performed.

In another aspect, the invention provides a method for adjusting a gain values for a color of a color filter array of an image sensor in an image captured under water, comprising,
- providing minimum and maximum gain values as a function of water depth;
- providing an initial value of a parameter indicative of a point in a range between minimum and maximum gain values for a water depth, the initial value is to be used as a first current value of the parameter; and
- adjusting a gain value for a color of the color filter array by
  - providing a stored image having been captured under water and corrected using a current gain value;
  - performing a white balance analysis of the stored image; and
  - based on the white balance analysis, determining whether the current parameter value should be adjusted towards the minimum or the maximum gain values and upon determining that the current parameter value should be adjusted, adjusting the parameter value by a predetermined amount and saving the new current parameter value;
  - determining a current water depth of the imaging device;
  - determining and saving a new current gain value based on the provided minimum and maximum gain values, the current water depth of the imaging device, and the current parameter value.

In a preferred embodiment, the adjustment of the parameter value and the gain value is only performed if the resulting gain value does not exceed the stored minimum or maximum gain value for the determined water depth.

In an embodiment, the invention provides a method for adjusting gain values in a video captured under water, where the method further comprises the step of, at predetermined intervals—such as time intervals, depth intervals, or video frame count intervals—repeating the step of adjusting a gain value for a color of the color filter array, using a stored video frame as the stored image on which the white balance analysis is performed.

The method for adjusting gain values in a video captured under water may be performed during capturing a video under water or in post-processing after recording, possibly on another device than the imaging device used for the capturing. For the post processing adjustment of gain values, the step of determining a current water depth of the imaging device comprises providing a log of current water depths determined during capturing of the video.

In another embodiment, the invention provides a method for capturing an image or a video under water using a digital imaging device having an image sensor with a color filter array and color correcting the captured image or video using the above method for adjusting a gain values for a color of the color filter array.

The steps comprised in the adjustment of a gain value—which the device control unit is configured to carry out or which are part of a method—are hereinafter also referred to as 'the gain value adjustment algorithm' or simply 'the algorithm' for simplicity. The algorithm does not include providing minimum and maximum gain value functions or an initial parameter value since these need only be provided once.

It is preferred that the device control unit is configured to perform the gain value adjustment algorithm recursively and that the methods according to the aspects herein may comprise performing the gain value adjustment algorithm recursively. The listings of the steps in the gain value adjustment algorithm do not indicate any particular order in which the steps must be carried out. Especially when performed recursively, the skilled person will understand that the particular order of the steps is not essential as long as that particular order is kept during consecutive runs.

When the algorithm is performed recursively, it may be preferable to sometimes run a simpler and/or faster algorithm or to leave out steps in some runs in between runs of the full algorithm. In particular, it may be preferable that the step of determining a current water depth comprises providing the last determined water depth or estimating a water depth based on one or more water depths determined previously from a sensed pressure outside the watertight housing. This may be advantageous since the water depth typically changes slowly relative to e.g. the framerate of a videorecording, and therefore need not be sampled so often. This may decrease power usage and increase speed of the algorithm.

The adjustment of gain values according to the invention occurs automatically, i.e. without user input, during capturing of a video under water and preferably during submerging of the imaging device whether the imaging device is capturing images/video or not, i.e. also in a stand-by mode.

According to embodiments of the invention, the gain values are dynamically adjusted to the underwater scene, i.e. to the combination of light source, water color, distance to object, and water depth. This improves the performance of the white balance correction and reduces the complexity for the user.

The gain value adjustment algorithm of the invention is based on a white balance analysis of an image that has already been corrected using the current (or previous) gain value, and not on an uncorrected (raw) image or an image corrected using a default white balance correction (with the possible exception of the first image after the imaging device is turned on). This provides the advantage that the current gain value is dynamically and gradually adjusted towards values on an optimal gain profile (gain value as a function of depth) during use, such as during a dive.

The feature that the gain value adjustment is performed via an adjustment of the parameter means that the gain value adjustment is not a determination of a specific gain value, but a determination of in which direction (up/down) the current gain value is gradually moved. The parameter is preferably adjusted often and in small steps. This provides the advantage that sudden changes and unrealistic colors caused e.g. by an artificial light source turning on or off are avoided.

BRIEF DESCRIPTION OF THE FIGURES

The following figures and examples are provided below to illustrate the present invention. They are intended to be illustrative and are not to be construed as limiting in any way.

DETAILED DESCRIPTION

Figure 1:
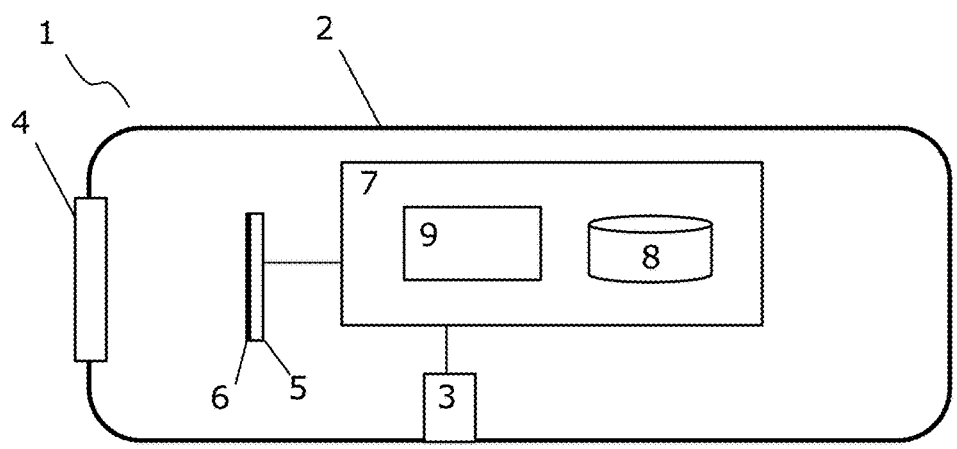
FIG. 1 is an illustration of an imaging device in accordance with an embodiment of the invention.

FIG. 1 illustrates a digital imaging device 1 for capturing images under water, having a watertight housing 2 and a depth gauge 3 such as a pressure sensor for sensing a pressure outside the watertight housing. The imaging devise has an optical system 4 for forming images on a digital image sensor 5. The image sensor 5 has a color filter array 6 comprising a mosaic of color filters placed over pixels (not shown) of the image sensor 5. The color filters are needed because the photosensors of the pixels detect light intensity with little or no wavelength specificity. The color filter array ensures that each pixel detects only light in a color range determined by its color filter. The most common color filter array is the Bayer color filter mosaic where half the pixels are 'green pixels', one forth are 'blue pixels' and one fourth are 'red pixels'. Other color filters utilizing other color filters than red, green and blue exists. The light intensity detected by each pixel corresponds to a pixel value. The pixel values in the raw output from the image sensor are multiplied by gain values specific to each pixel color to yield a viewable image, this process is referred to as color balancing. The part of color balancing related to adjust the final image to the color temperature of the light illuminating the imaged scene is commonly referred to as white balance (WB). Since the water absorption greatly influences the color temperature of light under water, the adjusting of gain values for colors of the color filter array in the invention can be referred to as a white balance adjustment or color correction.

The imaging device also comprises a device control unit 7 comprising a memory 8 and a processor 9.

The imaging device may be embodied by various devices for still and/or video imaging such as a digital camera, an SLR camera, a mirrorless camera, a telephone with integrated camera, a portable computer with integrated camera, an action camera, an underwater drone with integrated camera, a diving mask with integrated camera, etc.

The watertight housing comprised by the imaging device may be the default housing of the device—i.e. the device is per se watertight—or it may be a housing or casing used for encapsulating the device during use in harsh environments such as under water.

The means for sensing a pressure outside the watertight housing may be a pressure sensor integrated in the imaging device or in the watertight housing. If the pressure sensor integrated in the imaging device, a watertight housing may involve means for transferring the outside pressure to the pressure sensor in the device held inside the watertight housing.

Figure 2:
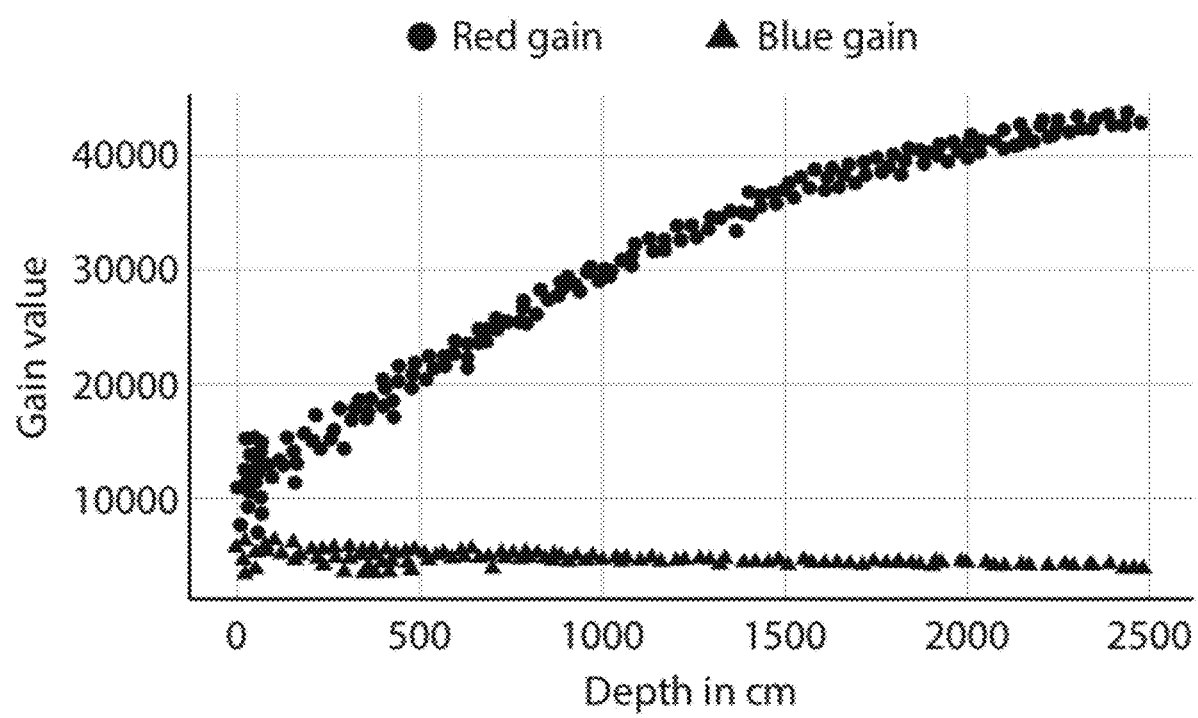
FIG. 2 is a graph showing exemplary red and blue gain values determined as a function of depth.

FIG. 2 is a graph illustrating gain value functions—gain values as a function of depth—for red, $G_R(D)$, and blue, $G_B(D)$ for images captured under water. Gain value functions can be determined by capturing images of a color chart illuminated by sunlight through with varying path length in water, analogous to varying water depths. The captured image at each depth is analyzed and a white balance algorithm is used to determine red ($G_R$), green ($G_G$), and blue ($G_B$) gain values that provide an image with an average color temperature of typically 6500K. In a simple embodiment, only a white field on the color chart is analyzed, and the average pixels values for the red ($Avg_R$), green ($Avg_G$) and blue ($Avg_B$) pixels of the color filter array within the white field are determined. When using a Bayer color filter array, green is most commonly used as a baseline and red and blue gain values are adjusted to obtain the desired color temperature. For other types of color filter arrays, another color may be chosen as baseline. With the object of providing a clear and concise description of the invention, the remainder of the description uses the example of a Bayer color filter array, green as baseline and a default gain factor of 4096. The skilled person will be able to apply the invention in other setups. With green as a baseline, the gain values for the depth at which the image was captured can be determined as $G_R=(Avg_G/Avg_R)*4096$ $G_G=1*4096$ $G_B=(Avg_G/Avg_B)*4096$ The graph of FIG. 2 shows the red and blue gain values determined in this way for a given water type and color. Gain value functions $G_R(D)$ and $G_B(D)$ can be generated by fitting a curve to the points or by generating line segments connecting the points. In some embodiments, the red and blue gain values are assumed to behave similarly and can be represented by a single gain value leading to a single gain value function for both colors.

The gain value function is specific to the absorption spectrum of the water and the light spectrum of the sunlight, both of which are subject to variation. The absorption spectrum of water varies with geographic location, but also with depth and over time at a fixed geographic location. The main influence on the absorption spectrum of water are particles and solutes in the water which often varies with depth due to thermoclines and vicinity to the sea floor as well as with time due to currents and disturbances of sediments on the sea floor. The light spectrum of the sunlight varies with the height of the sun, the weather, and under water also with state of the water surface (flat, rippled, small waves, big waves) due to reflection and scattering in the air-water interface.

As can be seen, since both the absorption spectrum of the water and the light spectrum of the sunlight are affected by many different parameters, it is very difficult to predict the optimal gain value function for a given time and place. Hence, relying on pre-recorded gain value functions as in the prior art such as U.S. Pat. No. 7,760,994, EP 2 550 559 B1 and EP 2 550 558 A1 will most often lead to sub-optimal results. The invention is thus advantageous for dynamically adjusting the gain values during use.

The minimum and maximum gain value functions, $G_{min}(D)$ and $G_{max}(D)$, used in the algorithm may be determined as described in relation to FIG. 2 in water that has very prominent colors, such as extremely blue, green or yellow water. Alternatively, the minimum and maximum gain value functions may be determined by simulation, from previous records of gain values adjusted by the algorithm of the invention, or may be theoretical extreme values.

In one embodiment, the minimum and maximum gain values for a color of the color filter array as a function of water depth are specific to one or more of: a geographic location of the imaging device, a list of current gain values as a function of water depth recorded for previous uses of the imaging device, water type or water color, e.g. selected by the user or by the imaging device. Similarly, the initial value of the parameter may be specific to one or more of: a geographic location of the imaging device, a list of current parameter values as a function of water depth recorded for previous uses of the imaging device, water type, or water color. The user or the imaging device may then, upon use, select stored minimum and maximum gain value functions and parameter initial value that correspond the best to the given situation, i.e. according to the geographic location, previous usage at this location, the water type, or the water color as determined by the user or the imaging device and use the selection when running the algorithm.

Figure 3:
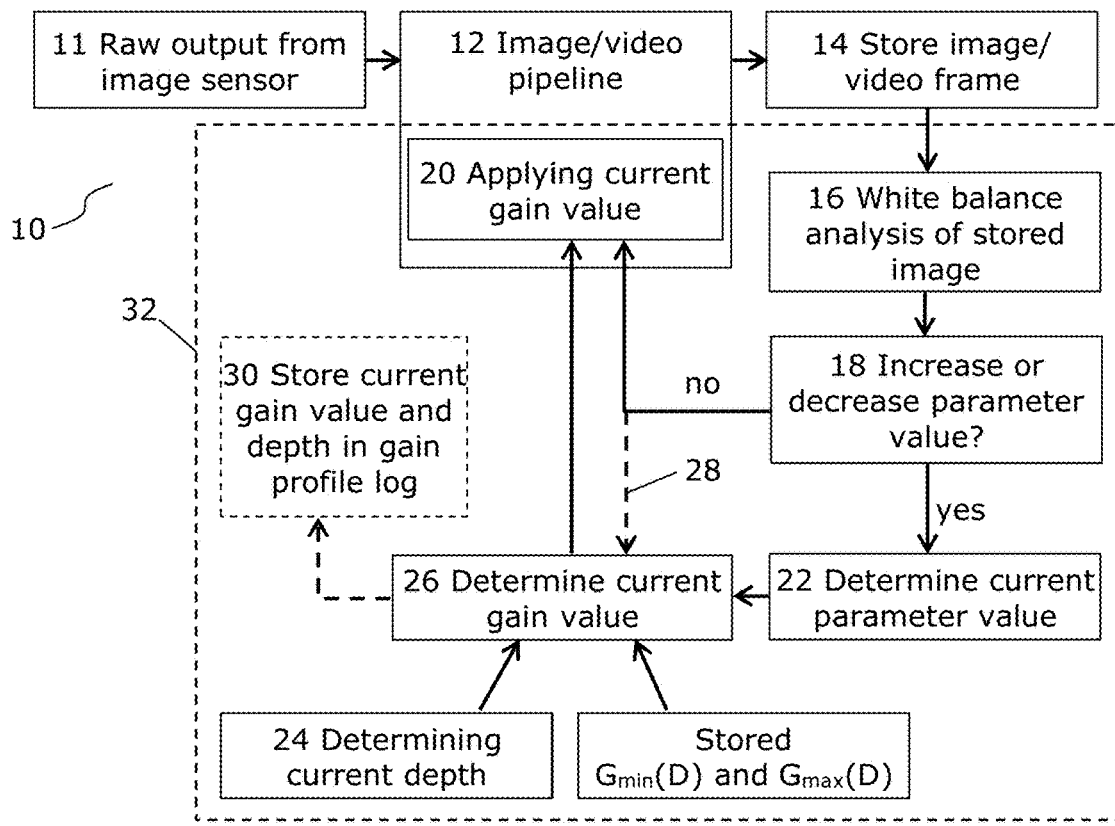
FIG. 3 is a flow chart illustrating the algorithm for adjusting a gain value according to embodiments of the invention.

FIG. 3 is a flow chart 10 illustrating, among other, the gain value adjustment algorithm carried out in a method of the invention or which the device control unit 7 is configured to carry out. The flow chart also shows steps 11, 12 and 14 carried out by the device control unit 7 independently of the algorithm as well as a number of optional steps 28, 30 and 32 to be commented on later.

When the imaging device 1 is recording, the device control unit 7 receives (step 11) raw output from the image sensor 5. The received raw output is processed in an image/video pipeline in step 12. An image/video pipeline is the set of software components used between an image source (here the image sensor) and an image renderer (such as a display or a printer) or a storage of images/videos ready for viewing or printing). An image/video pipeline may be implemented as computer software. Typical components of an image/video pipeline include image sensor corrections (such as applying standard gain values for colors of the color filter array), noise reduction, image scaling, gamma correction, image enhancement, colorspace conversion (e.g. between RGB from the color filter array to YUV), image/video compression, etc. As described later, the gain values determined by the algorithm of the invention will be applied to images/video frames as part of the image/video pipeline. The processed images will be stored in step 14, for example in storage 8 or in an external/removable storage such as a memory card.

Steps 11, 12 and 14 will be carried out when the imaging device records an image or a video, whether the gain value adjustment algorithm is applied or not.

The gain value adjustment algorithm of embodiments of the invention serves to adjust a gain value for a color of the color filter array. The adjusted gain values serve to correct images and videos captured under water for light absorption in the water. The basic steps of the algorithm are presented below, and each step is described in larger detail thereafter.

- performing (step 16) a white balance analysis of the stored image.
- based on the white balance analysis, determining (step 18) whether the current parameter value should be adjusted towards the stored minimum or the stored maximum gain values.
- upon determining that the current parameter value should not be adjusted, proceeding directly to step 20.
- upon determining that the current parameter value should be adjusted, adjusting (step 22) the parameter value by a predetermined amount (dP).
- determining (step 24) a current water depth.
- determining (step 26) a current gain value ($G_n$) based on the stored minimum and maximum gain values, the determined water depth, and the current parameter value.
- applying (step 20) the current gain value to a captured image The algorithm is preferably carried out recursively and therefore relies on an initial run with $P_n = P_0$. Such recursive runs may also include storing (step 14) the image to which the current gain values have been applied. When the algorithm is carried out recursively, some steps may be either at the end of a current run or at the beginning of the next run without influencing the results much, thus the order of the steps may vary.

White Balance Analysis of Stored Image—Step 16

The white balance analysis can be a known white balance algorithm for determining gain values for white balance correction, such as the Gray World or White Patch algorithms. In one embodiment, the White Patch algorithm is used which assumes that the image has a white patch in it and that it is the brightest spot in the image. The White Patch algorithm finds the brightest spot and determines gain values for the colors of the color filter array that results in this spot being white.

The image/frame used in the white balance analysis of step 16 is an image/frame that has been through the image/video pipeline of step 12, i.e. gain values determined by any previous run of the algorithm have already been applied.

In this description, 'n' is a counter for each sample of the white balance, i.e. each white balance analysis step 16. Preferably, the entire algorithm of adjusting a current gain value is run every time the white balance algorithm is performed.

In a preferred embodiment, the step of adjusting a gain value for a color of the color filter array is repeated at predetermined intervals so that the algorithm is run recursively. The predetermined interval could be time intervals, depth intervals or video frame count intervals. When the algorithm is run recursively at predetermined time intervals, a sampling rate, r, for the white balance analysis of images can be defined as the number of times step 16 is performed per second, i.e. the algorithm is also performed at rate r in which case 1/r is the period at which the algorithm is run.

In one embodiment, the device control unit is configured to adjust gain values for colors of the color filter array—i.e. run the algorithm—at predetermined intervals while the imaging device is turned on. Hence, also when not currently recording images or video, the imaging device may run the algorithm—including the recording an image that is WB analyzed but thereafter not used or deleted—to have a gain value ready for whenever recording is initiated. This provides the advantage that a video will be correctly color corrected from the first frame when recording is started. The predetermined interval may be the period 1/r of the rate at which the algorithm is run, and during standby the rate can be a relatively low $r_{stand-by}$ to save power.

The duration of the predetermined interval may depend on one or more of recording mode of the imaging device or water depth of the imaging device. For example, when the imaging device is recording videos or a series of images, the rate r can be higher than $r_{stand-by}$ in order to provide a more accurate color correction. Also, the user may select between different recording qualities, and it may be preferable to have a lower r in recording modes with lower recording quality. Further, as can be seen from FIGS. 3 and 7, the gain value functions become flat at larger depths, and it may be advantageous to automatically lower the rate r at such larger depths to save processing power as well as electric power.

Increase or Decrease Parameter Value?—Step 18

The outcome of the white balance analysis can be one or more gain values that would lead to a more desirable or appropriate white balance, and which are compared to the current gain value to determine whether to increase or decrease the gain value by increasing/decreasing the parameter. In another embodiment, the outcome of the white balance analysis can be a color temperature estimated by the analysis, and this can be compared to a target color temperature that may be predetermined or previously determined at the surface or at lower depths. A result of the comparison can be the decision to increase or decrease one or more parameters. In another embodiment, the outcome of the white balance analysis can be one or more scalars that indicates whether the analyzed image on average has too much/too little green, blue, or red, and the parameter can be increased or decreased to compensate this excess or deficit of color in the analyzed image. In either embodiment, the algorithm determines whether the current parameter value(s) should be adjusted towards the stored minimum (parameter decreased) or the stored maximum (parameter increased) gain values based on the white balance analysis.

If the outcome is that the current gain value leads to a satisfying white balance in the analyzed image, it is determined that the current gain value ($G_n$) should not be adjusted and thus that the current parameter value, $P_n$, should not be adjusted ('no' arrow to step 20). In that case, $G_n = G_{n-1}$ and $P_n = P_{n-1}$, and the current gain value is applied (step 20) in the pipeline of the next image/frame as well.

Adjusting the Parameter Value—Step 22

If the outcome is that the current gain value should be adjusted, the relevant parameter is adjusted, in step 22, by a predetermined amount, dP, to accommodate this adjustment. If $P \in [0; 1]$, dP is preferably equal to or smaller than 0.1 such as equal to or smaller than 0.05 or equal to or smaller than 0.02. Preferably, the decision of step 18 is based on whether the outcome of the white balance analysis falls within a range of values.

In one example, the white balance analysis of step 16 determines average green, blue and red pixel values for the white spot ($AVG_g$, $AVG_b$, $AVG_r$). The white balance algorithm will determine a ratio between green/red and green/blue for the average of a given spot or the whole image and output gain factors to equalize this particular area. If the ratios are provided, steps 18 and 22 of the algorithm can determine the new current red parameter value, $P_{R,n}$, as:

$$P_{R,0} = 0.5$$
$$P_{R,n} = AVG_G/AVG_R > 1 + Tr \text{ then } = P_{R,n-1} - dP$$
$$= AVG_G/AVG_R < 1 - Tr \text{ then } = P_{R,n-1} + dP$$
$$= AVG_G/AVG_R \in [1 - Tr; 1 + Tr] \text{ then } = P_{R,n-1}$$

Here, Tr defines a minimum deviation for from a target white balance so that P is only adjusted when the WB analysis yields a substantive deviation. If Tr=0, the parameter value will be adjusted except when the ratio is exactly equal to 1.

In another example, the white balance analysis of step 16 output suggested gain values, $G_{WB,n}$, to equalize a given spot or the whole image. The suggested gain values can be compared to the default gain value to determine a difference:

$$\Delta G_n = G_{WB,n} - 4096$$

This difference can be compared to a threshold value, Tv, below which the gain need not be adjusted, so that steps 18 and 22 of the algorithm can determine the new current parameter value, $P_n$, as:

$$P_0 = 0.5$$
$$P_n = \Delta G_n > Tv \text{ then } = P_{n-1} - dP$$
$$= \Delta G_n < -Tv \text{ then } = P_{n-1} + dP$$
$$= \Delta G_n \in [-Tv; Tv] \text{ then } = P_{n-1}$$

Figure 4:
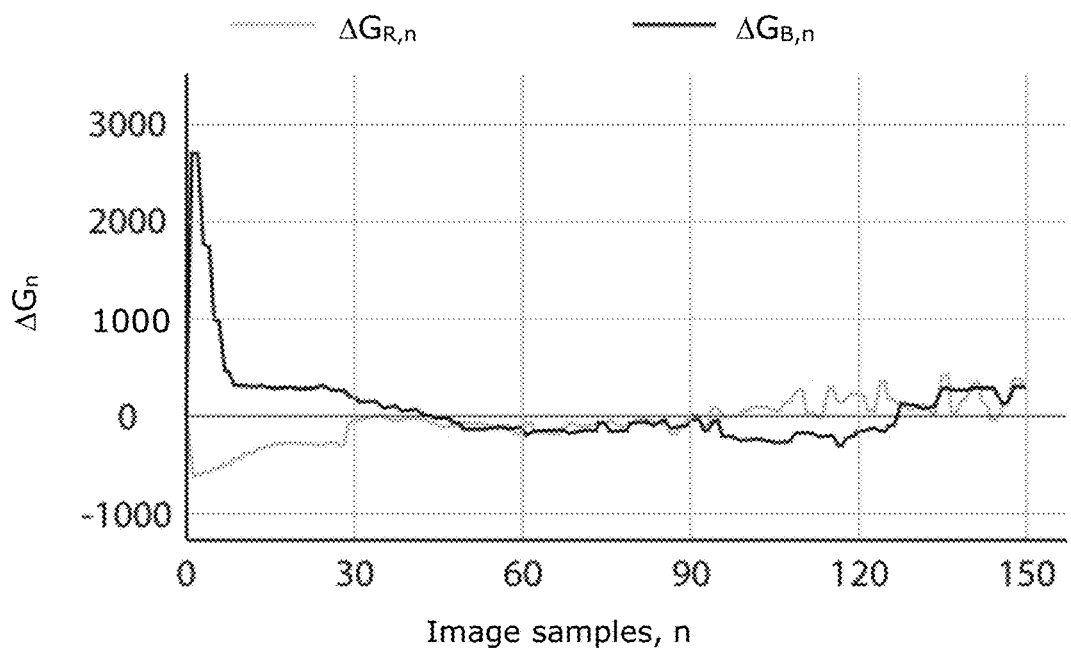
FIG. 4 is a graph showing exemplary differences between the (red and blue) gain values determined using the algorithm and the gain values that would have been used otherwise.
Figure 5:
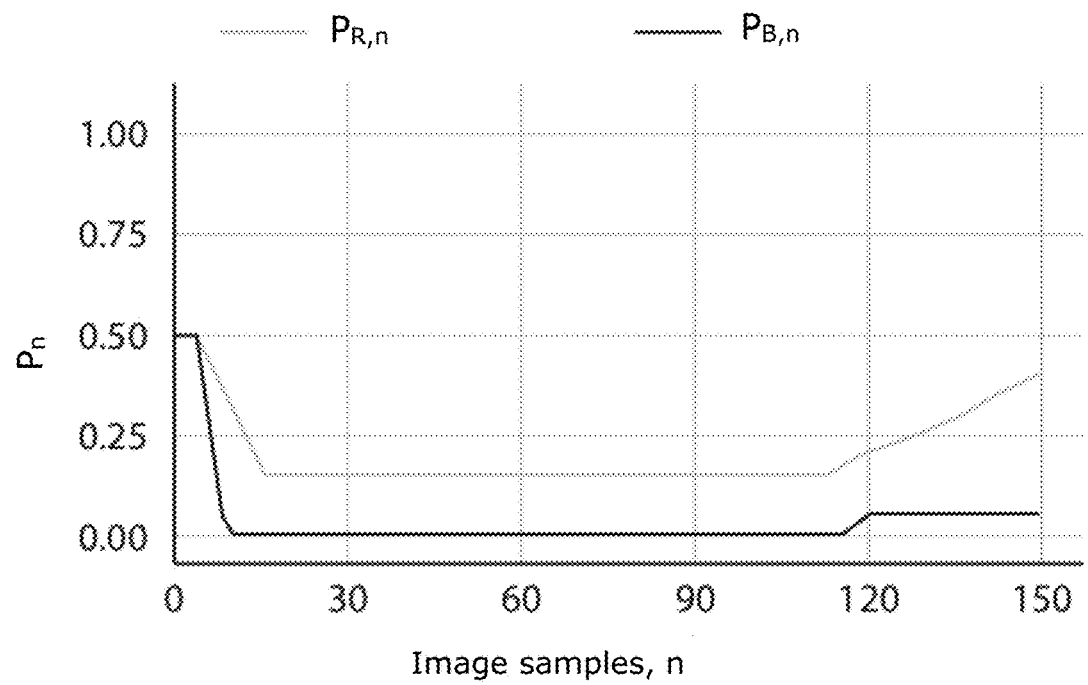
FIG. 5 is a graph showing an exemplary development of the parameter values.
Figure 6:
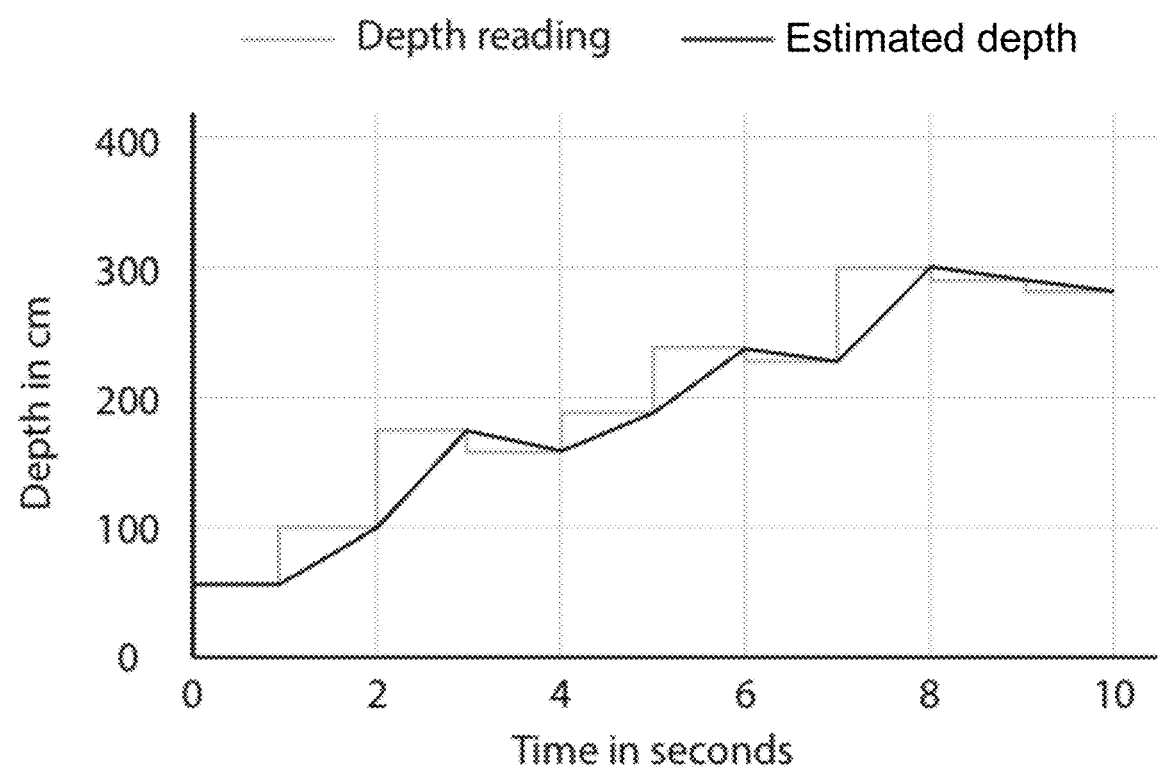
FIG. 6 is a graph showing exemplary depth samples and a smooth curve used to determine depth values used in embodiments of the algorithm.

FIG. 4 is a graph showing the development of the difference, $\Delta G_n$, with image samples, n, and with Tv=300 for red and blue gain values. FIG. 5 is a graph showing the development of the parameter, $P_n$, with image samples, n, and initial value $P_0$=0.5 for read and blue parameters.

Determining a Current Water Depth (D)—Step 24

Determination of water depth of the imaging device can be made using a depth gauge such as a pressure sensor for sensing the pressure outside of the watertight housing. Determining the current water depth can be made by reading a value of such pressure sensor and converting it to meters under the water surface As mentioned previously, the step of determining a current water depth can also comprise estimating a current water depth based on previously determined water depths from reading the pressure sensor. This may be advantageous since the water depth typically changes slowly relative to e.g. the framerate of a videorecording and the sampling rate, r, of the image WB analysis, and because reading the pressure sensor may take more time and/or use more power than the other steps of the algorithm. In one embodiment, the water depth is read at a much lower rate than r, for example at 1 $s^{-1}$ as compared to r=30 $s^{-1}$, and the water depth is thus only read once for every 30 runs of the algorithm. Hence, for the following 29 runs the no new water depth is read from the pressure sensor and instead of using the same water depth for 30 consecutive gain value adjustments, an intermediate current water depth may be determined by estimation. In one embodiment, the current water depth is estimated based on previous readings of the pressure sensor. In one example, a line between the two last readings is determined and can be divided into segments equal to the number of samples between the readings, so that each image WB sample uses a current water depth that has changed by that has changed by one such segment since the previous image WB sample. This is advantageous since it prevents sudden changes in the color correction caused by water depth changes that are fast relative to the water depth reading period. It also means that the determined current water depth lags behind the real water depth by one water depth reading period. In another example, a current water depth is forecasted based on two or more preceding water depts from pressure sensor readings. Numerous mathematical forecasts models for determining a forecasted line or curve are known to the skilled person. The forecasted curve is divided into segments corresponding to samples between readings so that each image WB sample uses a current water depth that has changed by one such segment since the previous image WB sample. This is advantageous since it provides a more accurate estimate of the real-time water depth. Changes between increasing-decreasing depth will however lead to larger discrepancies than the approach of the previous example.

Finally, when the gain value adjustment is performed in prost processing, the determination of a current depth in step 24 is the reading a log of current water depths determined during capturing of the video. This log may be based on pressure sensor readings and/or estimations as described above, or water depths determined by a different device that followed the imaging device and has been synched to the recording of the video.

Determining a Current Gain Value ($G_n$)—Step 26

In step 26, a (new) current gain value, $G_n$, is determined based on based on the stored minimum and maximum gain values ($G_{max}$, $G_{min}$), the determined water depth, D, and the current parameter value, $P_n$. On one embodiment, the current gain value is determined as:

$$G_n = G_{max}(D) - G_{min}(D))*P_n + G_{min}(D)$$

In words, the current gain value is a gain value at a point between the stored minimum and maximum gain values for the current depth corresponding to the value of the current parameter value.

As can be seen, the current gain value in the above equation may is a function of both depth, D, and the parameter, $P_n$, which are determined independently. Therefore, in an optional embodiment, a new current gain value may be determined even if it was determined in step 18 that the parameter value did not need to be adjusted, i.e. the 'no' arrow from step 18. According to this embodiment, the algorithm may, as indicated by arrow 28, proceed to step 26 of determining a new current gain value also when it was decided not to adjust the parameter value. In this case $P_n = P_{n-1}$ is used in the above equation for $G_n$, but since the depth may have changed the gain value may also change.

In one embodiment, the adjustment of the parameter value and the gain value is only performed if the resulting gain value does not exceed the stored minimum or maximum gain value for the determined water depth. This may secure that the algorithm does not run wild in case of errors in pressure sensing readings, bad pixels or other errors. For If $P \in [0; 1]$, this means that P is not adjusted if it would result in $P_n$ being outside this range.

As mentioned previously, the parameter as well as the gain value may be common to two or more colors of the color filter array, or separate colors may have individual parameters and gain values. In one embodiment, the memory is configured to hold, or the method comprises providing:

minimum and maximum gain values for at least two different colors ($G_{Rmin}(D)$, $G_{Rmax}(D)$, $G_{Bmin}(D)$, $G_{Bmax}(D)$) of the color filter array as a function of water depth;

an initial value of a parameter indicative of a point in a range between minimum and maximum gain values for a water depth for each of the at least two different colors, the initial value is to be used as a first current value of the parameter; and wherein the device control unit is configured to adjust a gain value for each of the at least two different colors of the color filter array individually.

Figure 7:
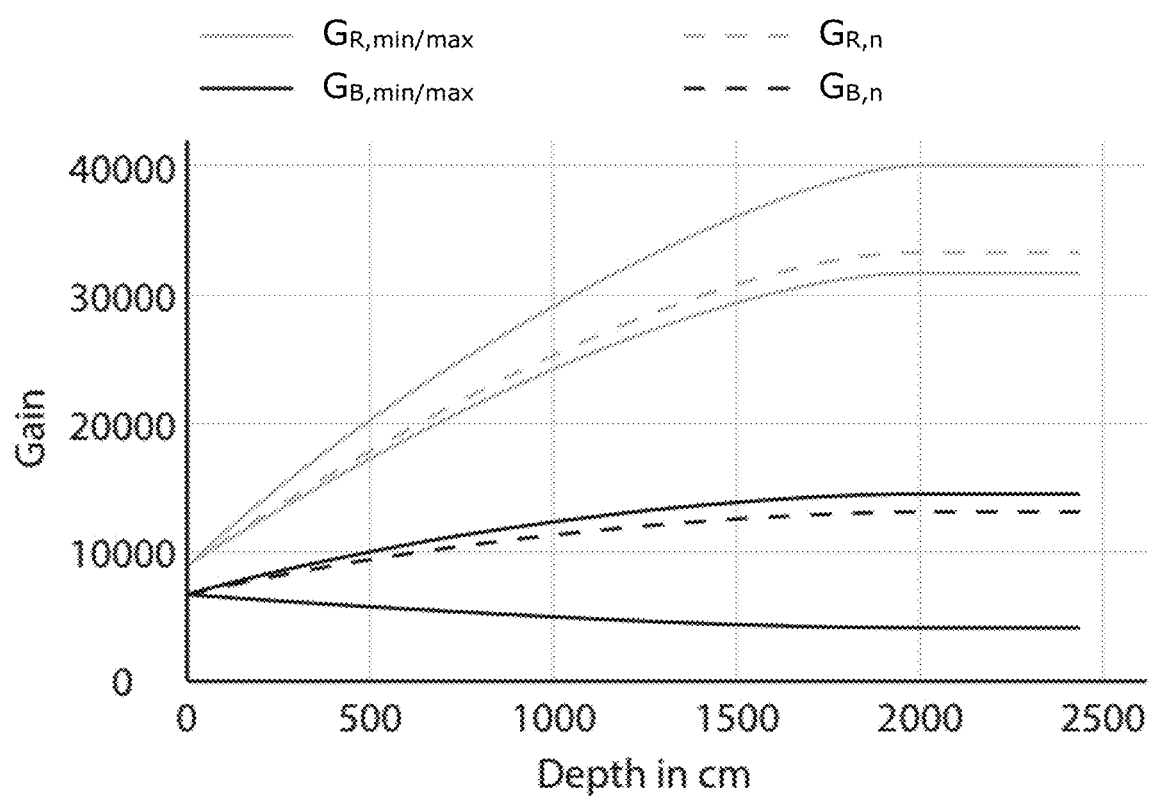
FIG. 7 is a graph showing exemplary minimum and maximum gain values and current gain values as a function of depth for red and blue gain values.

FIG. 7 is a graph illustrating, for red and blue pixels, both the minimum/maximum gain value functions (full lines) and the current gain values as determined by the algorithm (broken lines). The resulting red and blue gain value functions, i.e. the series of Go-values represented by the broken lines, are not known on beforehand, but determined by dynamically adjusting the gain values using the algorithm during the dive. This resulting gain value functions are thus specific to the exact conditions at the time and location of this specific dive or recording—conditions which are essentially impossible to predict.

In prior art such as U.S. Pat. No. 7,760,994, EP 2 550 559 B1 and EP 2 550 558 A1 different predetermined gain value functions are provided, and one is selected by the user or the camera. When recording an image, gain values are determined solely based on the selected gain value function and the current depth, and the determined gain values are applied in a correction, for example in the image pipeline. Here, there is no adjustment or evaluation of the selected gain value function during recording or during a dive, and the resulting color correction is only as good as the guess made by the user or camera when selecting between the predetermined gain value functions.

After determining the adjusted, new current gain value, it is applied to the next recorded image(s)/frame(s) in the image/video pipeline in step 20. In one embodiment, the algorithm further comprises storing (step 30) all the determined current gain values with their corresponding water depths in a gain profile log.

As mentioned above, the gain value functions resulting from the algorithm, i.e. the series of $G_n$-values in the gain profile log recorded at step 30, is a unique fingerprint of the conditions at the time and place of the recording. For later recordings at similar times and places, such as later during the same dive when returning to a previously visited depth or a following dive at the same or close location, the gain profile may be used for a fast and reliable source of gain values as a function of water depths.

When the gain value adjustment is performed in prost processing instead on online during recording, steps 11, 12 and 14 in FIG. 3 have been performed previously during recording. In this case, a post-processing algorithm 32 can be carried out on the stored video using a log of current depths as described previously.

The invention claimed is:

1. A digital imaging device (1) for capturing images under water, comprising:
   a watertight housing (2);
   a means (3) for sensing a pressure outside the watertight housing;
   an image sensor (5) for capturing digital images, the image sensor comprising a color filter array (6);
   an optical system (4) for imaging a scene onto the image sensor; and
   a device control unit (7) comprising a memory (8) and a processor (9);
   wherein the memory is configured to hold:
   minimum and maximum gain values ($G_{min}(D)$, $G_{max}(D)$) for a color of the color filter array as a function of water depth (D);
   an initial value ($P_0$) of a parameter ($P_n$) indicative of a point in a range between minimum and maximum gain values for a water depth, the initial value is to be used as a first current value of the parameter; and
   wherein the device control unit is configured to adjust a gain value for a color of the color filter array by:
   capturing and storing an image with a current gain value;
   performing a white balance analysis of the stored image;
   based on the white balance analysis, determining whether the current parameter value should be adjusted towards the stored minimum or the stored maximum gain values and upon determining that the current parameter value should be adjusted, adjusting the parameter value by a predetermined amount and saving the new current parameter value;
   determining a water depth (D) of the imaging device from a sensed pressure outside the watertight housing;
   determining and saving a new current gain value ($G_n$) based on the stored minimum and maximum gain values, the determined water depth, and the current parameter value.

2. The digital imaging device according to claim 1, wherein the device control unit is configured to adjust gain values for a color of the color filter array at predetermined intervals while the imaging device is turned on.

3. The digital imaging device according to claim 2, wherein a duration of the predetermined interval varies according to one or more of: recording mode of the imaging device or water depth of the imaging device.

4. The digital imaging device according to claim 1, wherein the imaging device is configured to capture a video under water, and wherein the device control unit is configured to adjust a gain value for a color of the color filter array at predetermined intervals during video capturing, using a captured and stored video frame as the stored image on which the white balance analysis is performed.

5. The digital imaging device according to claim 1, wherein the memory is configured to hold:
   minimum and maximum gain values for at least two different colors ($G_{Rmin}(D)$, $G_{Rmax}(D)$, $G_{Bmin}(D)$, $G_{Bmax}(D)$) of the color filter array as a function of water depth;
   an initial value ($P_{R0}$, $P_{B0}$) of a parameter ($P_{Rn}$, $P_{Bn}$) indicative of a point in a range between minimum and maximum gain values for a water depth for each of the at least two different colors, the initial value is to be used as a first current value of the parameter; and
   wherein the device control unit is configured to adjust a gain value for each of the at least two different colors of the color filter array individually.

6. The digital imaging device according to claim 1, wherein the minimum and maximum gain values for a color of the color filter array as a function of water depth are specific to one or more of: a geographic location of the imaging device, a list of current gain values as a function of water depth recorded for previous uses of the imaging device, a water type, or water color.

7. A method (10) for adjusting a gain value for a color of a color filter array of an image sensor in an image captured under water, comprising,
  providing minimum and maximum gain values as a function of water depth;
  providing an initial value of a parameter indicative of a point in a range between minimum and maximum gain values for a water depth, the initial value is to be used as a first current value of the parameter; and
  adjusting (32) a gain value for a color of the color filter array by
    providing a stored image having been captured under water and corrected (20) using a current gain value;
    performing (16) a white balance analysis of the stored image; and
    based on the white balance analysis, determining (18) whether the current parameter value should be adjusted towards the minimum or the maximum gain values and upon determining that the current parameter value should be adjusted, adjusting (22) the parameter value by a predetermined amount and saving the new current parameter value;
    determining (24) a current water depth of the imaging device;
    determining (26) and saving a new current gain value based on the provided minimum and maximum gain values, the current water depth of the imaging device, and the current parameter value.

8. The method for adjusting a gain value according to claim 7, comprising, at predetermined intervals, repeating the step of adjusting a gain value for a color of the color filter array, using a stored video frame as the stored image on which the white balance analysis is performed.

9. The method for adjusting gain values according to claim 8, wherein the method is performed during capturing a video under water, and wherein the step of providing a stored image comprises capturing and storing a video frame with the current gain value.

10. The method for adjusting gain values according to claim 8, wherein the method is performed in post-processing of a video captured under water, and wherein the step of determining a current water depth of the imaging device comprises providing a log of current water depths determined during capturing of the video.

* * * * *